(12) United States Patent
Kurokawa et al.

(10) Patent No.: US 10,579,304 B2
(45) Date of Patent: Mar. 3, 2020

(54) STORAGE APPARATUS AND INFORMATION PROCESSING PROGRAM

(71) Applicant: HITACHI, LTD., Tokyo (JP)

(72) Inventors: Midori Kurokawa, Tokyo (JP); Tsutomu Koga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 100 days.

(21) Appl. No.: 15/745,854

(22) PCT Filed: Dec. 10, 2015

(86) PCT No.: PCT/JP2015/084718
§ 371 (c)(1),
(2) Date: Jan. 18, 2018

(87) PCT Pub. No.: WO2017/098646
PCT Pub. Date: Jun. 15, 2017

(65) Prior Publication Data
US 2018/0210677 A1 Jul. 26, 2018

(51) Int. Cl.
*G06F 12/00* (2006.01)
*G06F 3/06* (2006.01)
(Continued)

(52) U.S. Cl.
CPC .......... *G06F 3/0659* (2013.01); *G06F 3/0604* (2013.01); *G06F 3/0611* (2013.01);
(Continued)

(58) Field of Classification Search
CPC ....................................................... G06F 12/00
(Continued)

(56) References Cited

U.S. PATENT DOCUMENTS

2006/0026345 A1\* 2/2006 Nishimoto .......... G06F 11/1076
711/114
2008/0155562 A1 6/2008 Stenfort et al.
(Continued)

FOREIGN PATENT DOCUMENTS

JP H11-053292 A 2/1999
JP H11-345096 A 12/1999
(Continued)

OTHER PUBLICATIONS

International Search Report for PCT/JP2015/084718 A1, dated Mar. 1, 2016.

*Primary Examiner* — Gautam Sain
(74) *Attorney, Agent, or Firm* — Volpe and Koenig, P.C.

(57) ABSTRACT

Provided is a storage apparatus including a plurality of storage devices which store data, a controller which executes data input/output processing to the storage devices, and a processor which transmits/receives information with the controller, wherein the controller manages a plurality of different tag numbers by separating the tag numbers into a plurality of groups, and upon receiving a first command from the processor, assigns a tag number belonging to one group among the plurality of groups to the first command, and transfers the first command to a designated storage device, and, upon subsequently receiving an instruction for a chip reset from the processor, executes a chip reset, and, upon subsequently receiving a second command from the processor, assigns a tag number belonging to a group which is different from the group used before the chip reset to the second command, and transfers the second command to a designated storage device.

13 Claims, 19 Drawing Sheets

(51) Int. Cl.
*G06F 11/07* (2006.01)
*G06F 13/10* (2006.01)

(52) U.S. Cl.
CPC .......... *G06F 3/0652* (2013.01); *G06F 3/0673* (2013.01); *G06F 3/0683* (2013.01); *G06F 11/0727* (2013.01); *G06F 11/0793* (2013.01); *G06F 12/00* (2013.01); *G06F 13/10* (2013.01)

(58) Field of Classification Search
USPC ........................................................ 711/166
See application file for complete search history.

(56) References Cited

U.S. PATENT DOCUMENTS

2010/0107029 A1* 4/2010 Kikuchi ................ H04L 1/1607
714/748
2012/0324078 A1* 12/2012 Sugimoto ........... G06F 13/4022
709/223
2016/0378921 A1* 12/2016 Ohnemus ............... G16H 15/00
705/2

FOREIGN PATENT DOCUMENTS

| JP | 2006-040011 A | 2/2006 |
| JP | 2010-109530 A | 5/2010 |
| JP | 2010-519617 A | 6/2010 |

* cited by examiner

FIG.10

| Operation Tag Pool # | | ~202 |
|---|---|---|
| 0 or 1 | | |
| Pool 0 | Pool1 | ~204 |
| Valid | | |
| 0 | 1 | ~206 |
| 0x0000 | 0x0100 | |
| 0x0001 | 0x0101 | |
| ... | ... | |
| 0x00FF | ... | |
| | 0xFFFF | |
| | | |
| | | |
| | | |
| Boundary Value | | ~208 |
| 0x0100 | | |

| Operation Tag Pool # | | | | 202 |
|---|---|---|---|---|
| 0 or ... or N | | | | |
| Pool 0 | Pool1 | ... | PoolN | 204 |
| Valid | | | | |
| 0 | 1 | ... | N | 206 |
| 0x0000 | 0x0100 | | 0xFF00 | |
| 0x0001 | 0x0101 | | 0xFF01 | |
| ... | ... | | ... | |
| 0x00FF | 0x01FF | | 0xFFFF | |
| | | | | |
| | | | | |
| | | | | |
| | | | | |
| Boundary Value | | | | 208 |
| 0xN | | | | |

| Tag Pool Value | | | | |
|---|---|---|---|---|
| 0 or 1 | | | | |
| IO Issued Flag | | | | |
| ON or OFF | | | | |
| All Device Reset Request Flag | | | | |
| ON or OFF | | | | |
| Flag | Task | IO | | |
| Task | 1 | 0 | ... | |
| IO | 0 | 1 | ... | |
| ... | ... | ... | ... | |

102 — Tag Pool Value
104 — IO Issued Flag
110 — All Device Reset Request Flag
112

(B)

| Task Tag Pool | | IO Tag Pool | |
|---|---|---|---|
| 0 | 1 | 0 | 1 |
| 0x0000 | 0x8000 | 0x0100 | 0x8100 |
| 0x0001 | 0x8001 | 0x0101 | 0x8001 |
| ... | ... | ... | ... |
| 0x00FF | 0x80FF | ... | ... |
| | | 0x7FFF | 0xFFFF |
| | | | |
| | | | |
| | | | |

210 — Task Tag Pool
212 — IO Tag Pool

FIG.18

| Operation Tag Pool Value | | Pool 0 | Pool1 |
|---|---|---|---|
| 0 or 1 | | Valid | |
| Task Tag Pool | | IO Tag Pool | |
| 0 | 1 | 0 | 1 |
| 0x0000 | 0x8000 | 0x0100 | 0x8100 |
| 0x0001 | 0x8001 | 0x0101 | 0x8001 |
| ... | ... | ... | ... |
| 0x00FF | 0x80FF | ... | ... |
| | | 0x7FFF | 0xFFFF |
| | | | |
| | | | |
| | | | |
| Flag | Task | IO | |
| Task | 1 | 0 | ... |
| IO | 0 | 1 | ... |
| ... | ... | ... | ... |

STORAGE APPARATUS AND INFORMATION PROCESSING PROGRAM

TECHNICAL FIELD

The present invention relates to a storage apparatus and an information processing program for controlling the data input/output to and from storage devices.

BACKGROUND ART

In a storage apparatus which manages various types of drives (storage devices), when the input/output of data to and from the drives is controlled by using a SAS (Serial Attached SCSI) protocol as the backend interface, a SAS controller is used as the controller. With this type of controller, when an IO (Input Output)-based command is received from a CPU (Central Processing Unit) which processes commands received from a host computer, the controller assigns a tag number to each IO and accesses the drive according to the IO to which the tag number was assigned. Each drive performs IO processing based on the tag number, and sends the processing result to the controller. Here, when a chip reset is instructed from the CPU to the controller, the controller executes Power On Reset, and is initialized. Subsequently, when the status of failure is recovered and an IO-based command is sent from the CPU to the controller, the controller assigns a tag number to each IO and accesses the drive according to the IO to which the tag number was assigned. Here, in the controller, a tag number that is the same as the tag number assigned before the chip reset is assigned to each IO, and, in cases where the chip reset is executed before the previous IO processing is completed and the IO having the same tag number is assigned to the same drive, information to the effect that a tag overlap has occurred is notified from each drive to the controller, and IO processing cannot be executed in the respective drives. As this type of system, proposed is a type configured to facilitate the communication between one initiator and SATA (Serial AT Attachment) devices (refer to PTL 1).

CITATION LIST

Patent Literature

[PTL 1] Japanese Translation of PCT International Application Publication No. 2010-519617

SUMMARY OF THE INVENTION

Problems to be Solved by the Invention

In cases where, while IO is being executed, a chip reset is instructed by the storage apparatus due to some reason and the controller thereafter discards the tag number assigned before the chip reset on the condition that a given period of time has elapsed and subsequently receives an IO-based command from the CPU, IO processing can be executed in the drives without any overlap of the tag numbers by assigning a tag number for each IO.

Nevertheless, in the foregoing case, because a waiting time for the processing will arise until the lapse of a given period of time will occur after the chip reset, the failure processing recovery time until the drives can execute IO processing becomes longer. Moreover, if a drive is subject to a failure and the response from the drive is delayed, it becomes difficult to set a latency time until the drives can resume IO processing.

Moreover, when the controller resets all drives after the chip reset and subsequently receives an IO-based command from the CPU, it is possible to prevent the overlap of tag numbers in the drive by assigning a tag number for each IO.

Nevertheless, when a plurality of drives are connected to the controller, because IO cannot be resumed until all drives are reset, the failure processing recovery time until IO can be resumed becomes longer. In addition, if any one of the drives is subject to a failure, much time will be required for resetting all of the drives, and IO cannot be resumed even in normal drives. When IO is resumed in a state where any one of the drives is subject to a failure, a tag overlap may occur. Moreover, when all of the drives are reset, a tag overlap may occur in the reset request.

An object of the present invention is to prevent the overlapping of tag numbers to be assigned to each command even when the failure processing recovery time is shortened after the chip reset.

Means to Solve the Problems

In order to achieve the foregoing object, the present invention provides a storage apparatus including a plurality of storage devices which store data, a controller which executes data input/output processing to the storage devices, and a processor which transmits/receives information to and from the controller, wherein the controller manages a plurality of different tag numbers by separating the plurality of different tag numbers into a plurality of groups, and, upon receiving a command from the processor, assigns a tag number belonging to a group which is different before and after a chip reset to the command, and transfers the command to a designated storage device.

Advantageous Effects of the Invention

According to the present invention, even when the failure processing recovery time is shortened after the chip reset, it is possible to prevent the overlapping of tag numbers to be assigned to each command.

BRIEF DESCRIPTION OF DRAWINGS

FIG. 2 is a conceptual diagram for explaining the concept of the first embodiment, wherein FIG. 2(A) is a block diagram and FIG. 2(B) is a diagram showing the tag flow.

FIG. 7 is a diagram for explaining the concept of the second embodiment, wherein FIG. 7(A) is a configuration diagram of a controller management table, FIG. 7(B) is a configuration diagram of another controller management table, and FIG. 7(C) is a block diagram for explaining the operation of the CPU.

FIG. 10 is a configuration diagram of a controller management table in the second embodiment.

FIG. 14 is a configuration diagram of another controller management table in the second embodiment.

FIG. 16 is a diagram for explaining the concept of the third embodiment, wherein FIG. 16(A) is a configuration diagram of a micro management table, and FIG. 16(B) is a configuration diagram of a controller management table.

FIG. 18 is a configuration diagram of a controller management table in the third embodiment.

DESCRIPTION OF EMBODIMENTS

First Embodiment

Figure 1:
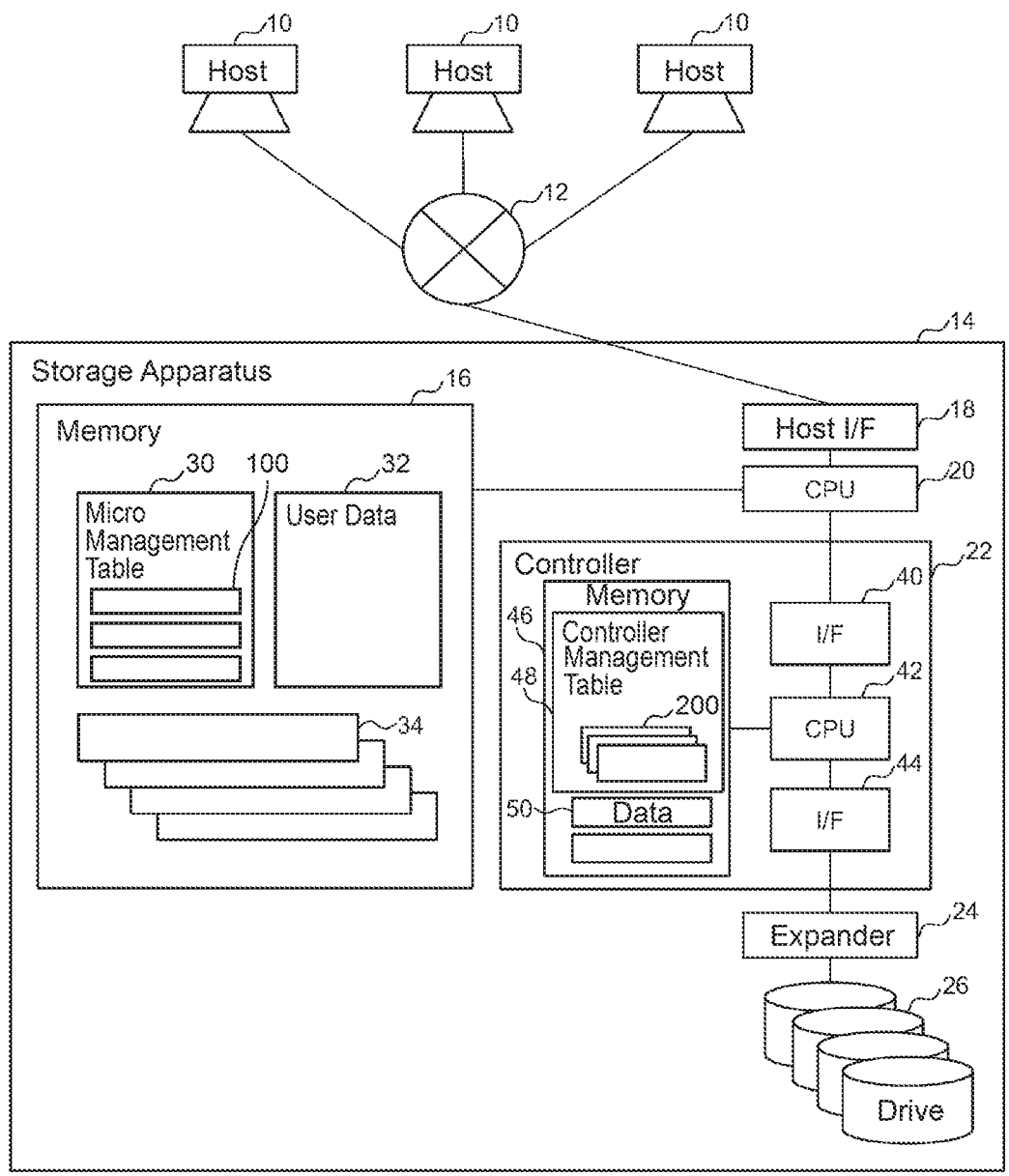
FIG. 1 is a configuration diagram of a storage system showing an embodiment of the present invention.

An embodiment of the present invention is now explained with reference to the appended drawings. FIG. 1 is a configuration diagram of a storage system showing an embodiment of the present invention. In FIG. 1, the storage system is configured by comprising a plurality of host computers (hereafter referred to as the "hosts (Hosts)") 10, a network 12, and a storage apparatus (Storage) 14.

Each host 10 is a computer device comprising information processing resources such as a CPU, a memory, and an input/output interface, and is configured, for example, as a personal computer, a workstation, or a mainframe. By issuing to the storage apparatus 14 an access request, such as a write request or a read request, designating a logical volume provided by the storage apparatus 14, each host 10 can access that logical volume.

The storage apparatus 14 is a computer configured from a memory (Memory) 16, a host interface (Host I/F) 18, a CPU 20, a controller (CTL) 22, one or more expanders (EXP) 24, and a plurality of drives (Drives) 26.

A storage area 30 of the memory 16 stores a plurality of micro management tables (Tables) 100, a storage area 32 of the memory 16 stores user data (User Data), and a plurality of storage areas 34 of the memory 16 respectively store storage firmware (Storage Firmware) as a micro program. The host interface 18 is configured as an interface to be connected to a network 12. The CPU 20 is a processor which governs the control of the overall storage apparatus 14, and executes various types of processing based on the programs (micro programs) stored in the memory 16. For example, upon receiving a command including an access request from the host 10 via the host interface 18, the CPU 20 analyzes the command and executes arithmetic processing according to the analysis result, as well as transfers the command to the controller 22 and, if a chip reset request is issued due to a failure or the like during the course of processing the program, sends a chip reset instruction to the controller 22. Meanwhile, upon receiving data and processing results from the controller 22, the CPU 20 sends the received data and processing results to the host 10 via the host interface 18.

The controller 22 is configured from an interface (I/F) 40, a CPU (internal CPU) 42, an interface (I/F) 44, and a memory (Memory) 46. A storage area 48 of the memory 46 stores a plurality of controller (CTL) management tables (Tables) 200, and a plurality of storage areas 50 of the memory 46 respectively store data (Data).

The CPU 42 transmits/receives information (including commands, instructions, and requests) to and from the CPU 20 via the interface 40, and performs data input/output processing to each drive 26 via the interface 44 and the expander 24. Here, when the CPU 42 is to issue an IO-based command to the drive 26, the CPU 42 assigns a tag number to the IO. The expander 24 selects the designated drive 26 among the plurality of drives 26 according to the command from the CPU 42, and transfers the command to the selected drive 26. Moreover, the CPU 42 executes Power On Reset upon receiving a chip reset instruction from the CPU 20. Here, the CPU 42 is initialized based on the processing of Power On Reset.

Each drive 26 is configured from a storage device which stores data. As each drive 26, for example, used may be an HDD (hard disk drive), a hard disk device, a semiconductor memory device, an optical disk device, a magneto optical disk device, a magnetic tape device, or a flexible disk device. As the hard disk device, for example, used may be a SCSI (Small Computer System Interface) disk, a SATA (Serial ATA) disk, an ATA (AT Attachment) disk, or a SAS (Serial Attached SCSI) disk, As the semiconductor memory device, for example, used may be an SSD (Solid State Drive), a phase-change memory (Ovonic Unified Memory), or an RRAM (registered trademark) (Resistance Random Access Memory).

Figure 2:
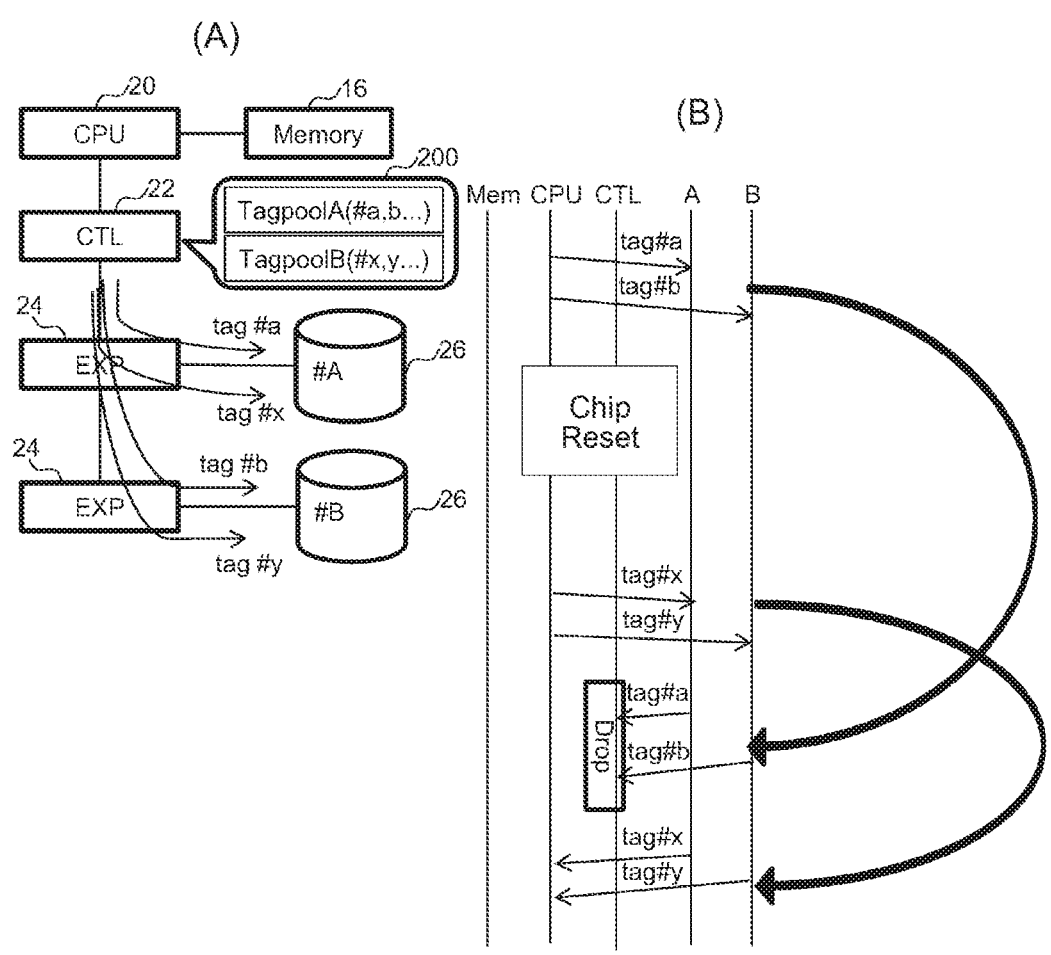

FIG. 2 is a conceptual diagram for explaining the concept of the first embodiment, wherein FIG. 2(A) is a block diagram and FIG. 2(B) is a diagram showing the tag flow. In FIG. 2, the controller 22 manages a plurality of different tag numbers (Tag #) by using a micro management table 200 in which a plurality of different tag numbers (Tag #) are separated into a plurality of groups, such as a group of a tag pool A and a group of a tag pool B, and stored therein, and, upon receiving an IO-based first command (CMD) from the CPU 20, assigns, to each command, Tag # a and Tag # b as tag numbers belonging to the tag pool A as one group, and accesses, via the expander 24, the drive 26 of # A and the drive 26 of # B based on the commands to which the respective tag numbers were assigned.

When a chip reset instruction is subsequently issued from the CPU 20, the controller 22 switches the group for assigning the tag numbers from one group (group of tag pool A) to another group (group of tag pool B). Upon subsequently receiving an IO-based command (Second command) from the CPU 20, the controller 22 assigns, to each command, Tag # x and Tag # y as the tag numbers belonging to the tag pool B, and accesses the drives 26 of # A and # B based on the commands to which the respective tag numbers were assigned.

Subsequently, the controller 22 performs processing (Drop) for discarding the tag numbers, Tag # a, and Tag # b issued before the chip reset. In the foregoing case, each drive 26 performs data input/output processing according to Tag # x and Tag # y, and assigns Tag # x and Tag # y as the tag numbers to the processing result and then sends the processing result to the controller 22. Consequently, each drive 26 can execute IO processing in a short time without any overlap of tag numbers after the chip reset.

Figure 3:
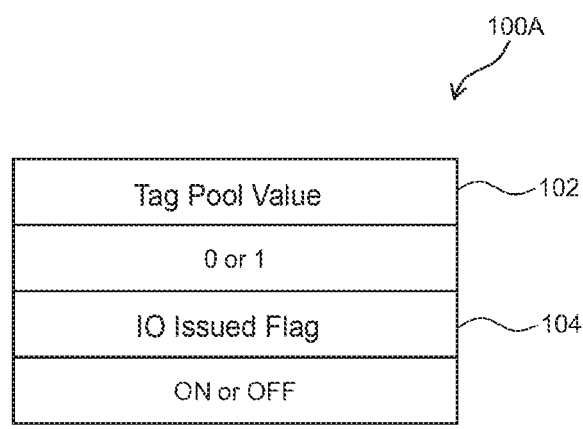
FIG. 3 is a configuration diagram of a micro management table in the first embodiment.

FIG. 3 is a configuration diagram of a micro management table in the first embodiment. In FIG. 3, the micro management table 100A is a table stored in the memory 16, and is configured by comprising a tag pool value 102, and an IO issued flag 104. When a plurality of tag numbers are separated into two groups and stored in the memory 46 managed by the controller 22, the tag pool value 102 stores the information of "0" upon identifying one group, and the information of "1" is stored upon identifying the other group. The IO issued flag 104 stores the information of "ON" when the CPU 20 has previously issued an IO as a command; that is, when an IO issued flag has been set, and stores the information of "OFF" when the CPU 20 has not yet issued an IO as a command; that is, when an IO issued flag has not been set.

Figure 4:
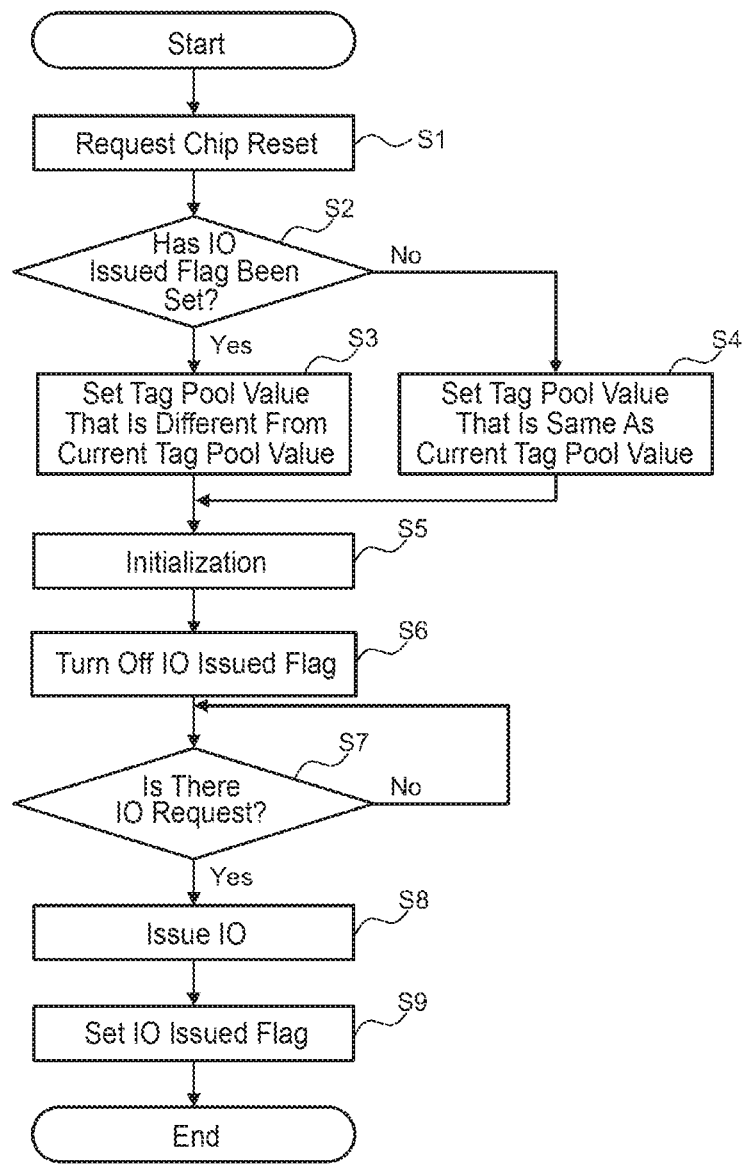
FIG. 4 is a flowchart for explaining the operation of the CPU in the first embodiment.

FIG. 4 is a flowchart for explaining the operation of the CPU in the first embodiment. In FIG. 4, when the CPU 20 receives a chip reset request, for example, as a result of activating a micro program (S1), the CPU 20 refers to the IO issued flag 104 of the micro management table 100A, and evaluates whether or not an IO issued flag has been set (S2).

When a positive determination result is obtained in step S2, the CPU 20 refers to the tag pool value 102 of the micro management table 100A, and sets a tag pool value which is different from the currently set tag pool value (S3). For example, when "0" is currently set as the tag pool value 102, then "1" is set.

Meanwhile, when a negative determination result is obtained in step S2, the CPU 20 refers to the tag pool value 102 of the micro management table 100A, and sets a tag pool value that is the same as the currently set tag pool value 102 (S4).

Subsequently, the CPU 20 initializes the controller 22 and sets the tag pool value that was set in step S3 or step S4 (S5), as well as causes the controller 22 to execute a chip reset and sets the IO issued flag 104 to "OFF" (S6), and thereafter newly evaluates whether or not an IO request has been issued (S7). The processing of step S7 is continued until a new IO request is issued.

When it is evaluated that an IO request has been issued in step S7, the CPU 20 issues an IO to the controller 22 (S8), sets the IO issued flag to "ON" (S9), and then ends the processing in this routine.

Figure 5:
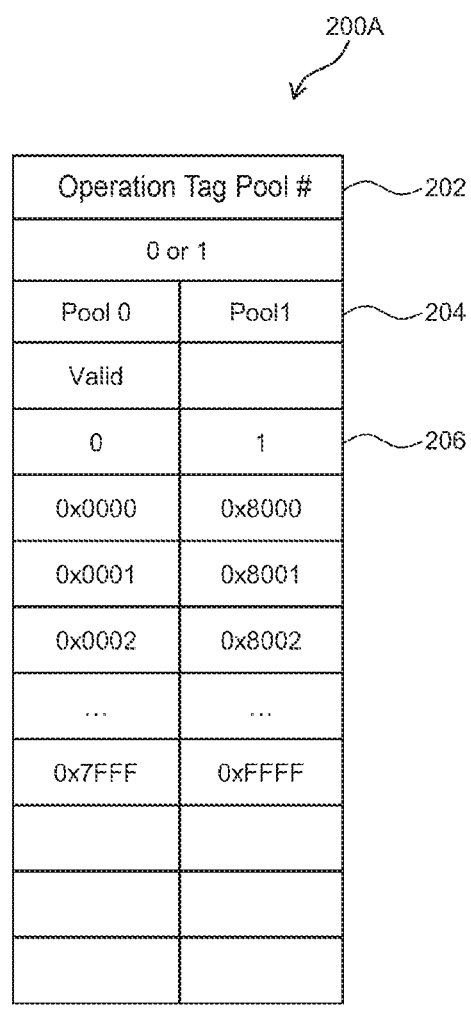
FIG. 5 is a configuration diagram of a controller management table in the first embodiment.

FIG. 5 is a configuration diagram of a controller management table in the first embodiment. In FIG. 5, the controller management table 200A is a table stored in the memory 46 of the controller 22, and is configured by comprising an operation tag pool number (Tag Pool #) 202, a pool number 204, and a tag group number 206. The operation tag pool number 202 stores the information of "0" or "1" as the information corresponding to the tag pool value set by the CPU 20. The pool number 204 is configured from a pool 0 and a pool 1, and stores the information of "Valid" as being valid in a pool number (one pool number) corresponding to the pool number set in the operation tag pool number 202. For example, when "0" is set in the operation tag pool number (Tag Pool #) 202, the information of "Valid" as being valid is stored in the pool 0 of the pool number 204.

The tag group number 206 is configured by being separated into two groups, for example, a group of 0 (group of #0) and a group of 1 (group of #1). The tag group number 206 of #0 stores the information of "0x0000" to "0x7FFF" as the tag number, and the tag group number 206 of #1 stores the information of "0x8000" to "0xFFFF" as the tag number.

Figure 6:
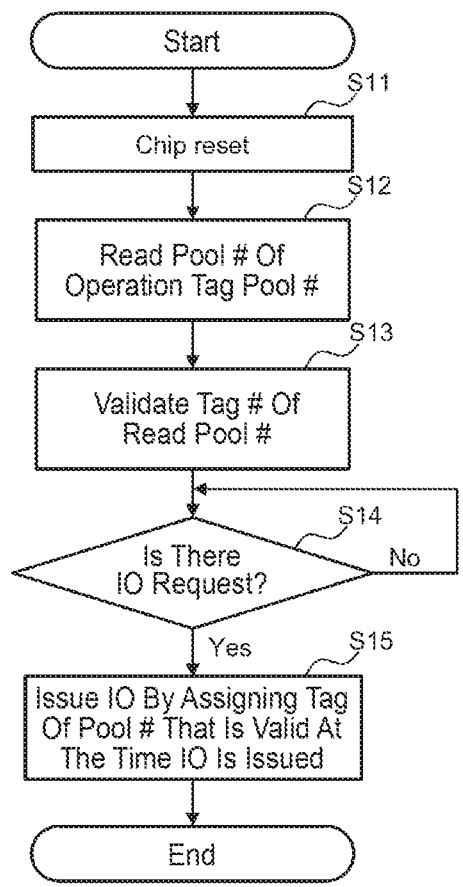
FIG. 6 is a flowchart for explaining the operation of the controller in the first embodiment.

FIG. 6 is a flowchart for explaining the operation of the controller in the first embodiment. In FIG. 6, when the controller 22 receives a chip reset signal as a chip reset instruction from the CPU 20, the controller 22 executes a chip reset (S11), subsequently refers to the operation tag pool number 202 of the controller management table 200A and reads the pool number (Pool #) of the operation tag pool number 202 (S12), and sets the tag number (Tag #) of the read pool number to "Valid" (S13). For example, when the value of the operation tag pool number 202 is "0", the controller 22 stores "Valid" in the pool 0 of the pool number 204, and sets the tag number belonging to the group of #0 of the tag group number 206 to "Valid".

Subsequently, the controller 22 evaluates whether or not an IO request has been issued (S14). When a positive determination result is obtained in step S14; that is, when a new IO request has been received from the CPU 20, the controller 22 refers to the tag group number 206 based on the information of the pool number 204 that is valid upon issuing the IO; for example, issues the IO by assigning to the IO, as a tag, the tag number belonging to the group of #0 of the tag group number 206 (S15), accesses the drive 26 based on the IO to which the tag number was assigned, and then ends the processing in this routine.

In this embodiment, the controller 22 manages a plurality of different tag numbers by separating the plurality of different tag numbers into a plurality of groups, and, upon receiving a first command from the CPU 20, assigns a tag number belonging to one group among the plurality of groups to the first command, and transfers the first command to which the tag number was assigned to a designated drive 26, and, upon subsequently receiving an instruction for a chip reset from the CPU 20, executes a chip reset, and, upon subsequently receiving a second command from the CPU 20, assigns a tag number belonging to a group which is different from the group used before the chip reset to the second command, and transfers the second command to which the tag number was assigned to a designated drive 26.

Here, the CPU 20 adds group information (tag pool value) for identifying one group among the plurality of groups to a command before issuing the instruction of the chip reset, and adds, to a command after issuing the instruction of the chip reset, group information (tag pool value) for identifying another group which is different from the group belonging to the group information (tag pool value) added to the command before issuing the instruction of the chip reset among the plurality of groups. Upon receiving the command from the CPU 20 before or after the chip reset, the controller 22 can identify the group according to the group information (tag pool value) added to the received command. In other words, by identifying the group according to the group information (tag pool value) added to the command, the controller 22 can prevent the overlap of tag numbers to be added to the command after the chip reset. Moreover, upon receiving a plurality of second commands from the CPU 20 after the chip reset, the controller 22 assigns, in sequence, a tag number belonging to the different group to each of the second commands.

According to this embodiment, even when the failure processing recovery time is shortened after the chip reset, it is possible to prevent the overlapping of tag numbers to be assigned to each command. Thus, each drive 26 is able to execute IO processing after the chip reset within a set time.

Second Embodiment

Figure 7:
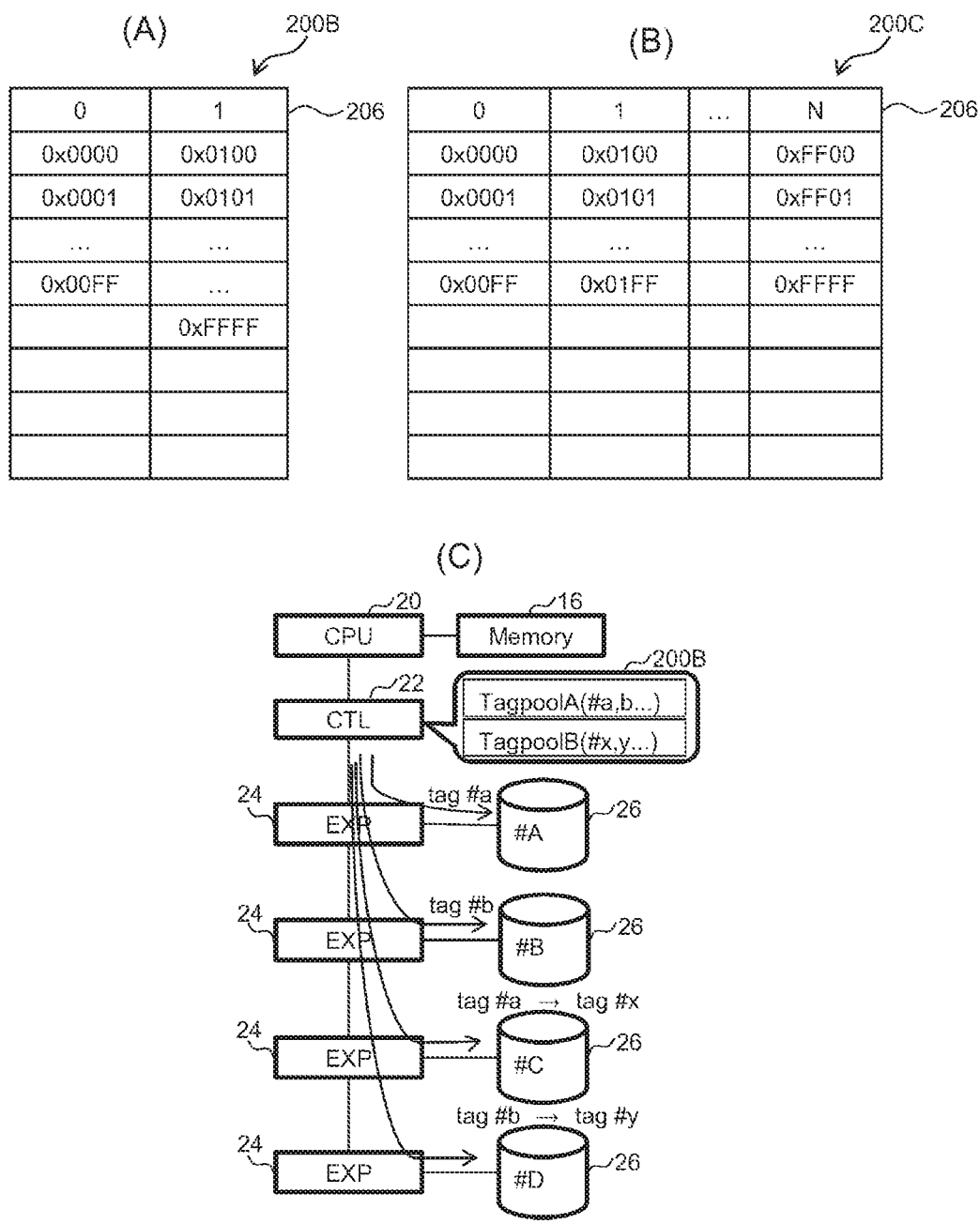

FIG. 7 is a diagram for explaining the concept of the second embodiment, wherein FIG. 7(A) is a configuration diagram of a controller management table, FIG. 7(B) is a configuration diagram of another controller management table, and FIG. 7(C) is a block diagram for explaining the operation of the CPU.

In FIG. 7(A), when the controller 22 manages the controller management table 200B, the controller 22 manages a plurality of tag numbers by separating the plurality of tag numbers into two groups (tag group numbers). For example, the controller 22 manages the tag group number 206 by separating the tag group number 206 into a group of 0 (group of #0) and a group of 1 (group of #1), stores the information of "0x0000" to "0x00FF" as the tag number in the tag group number 206 belonging to the group of #0, stores the information of "0x0100" to "0xFFFF" as the tag number in the tag group number 206 belonging to the group of #1, and variably sets the number of tag numbers belonging to the respective groups. In the foregoing case, the number of tag numbers belonging to the group of #1 is greater than the number of tag numbers belonging to the group of #0.

Moreover, as shown in FIG. 7(B), when the controller 22 manages the controller management table 200C, the controller 22 manages a plurality of tag numbers by separating the plurality of tag numbers into two or more groups (tag group numbers). For example, the controller 22 manages the tag group number 206 by separating the tag group number 206 into a group of 0 (group of #0) to a group of N (group of # N), stores the information of "0x0000" to "0x00FF" as the tag number in the tag group number 206 belonging to the group of #0, stores the information of "0x0100" to "0x01FF" as the tag number in the tag group number 206 belonging to the group of #1, and stores the information of "0xFF00" to "0xFFFF" as the tag number in the tag group number 206 belonging to the group of # N. In the foregoing case, the same number of tag numbers is stored in each group, and, during a failure in which a chip reset is frequently required, it would be effective to use the tag numbers stored in the controller management table 200C.

In FIG. 7(C), the controller 22 manages a plurality of different tag numbers (Tag #) by using the micro management table 200B in which a plurality of tag numbers (Tag #) are separated into a plurality of groups, such as a group of a tag pool A (group in which the tag group number 206 is #0) and a group of a tag pool B (group in which the tag group number 206 is #1), and, upon receiving an IO-based command (CMD) from the CPU 20, assigns, to each command, Tag # a ("0x0000") and Tag # b ("0x0001") as tag numbers (tag numbers of the group of #0) belonging to the tag pool A as one group, and accesses, via the expander 24, the drive 26 of # A and the drive 26 of # B based on the commands to which the respective tag numbers were assigned.

When a chip reset instruction is subsequently issued from the CPU 20, the controller 22 switches the group for assigning the tag numbers from one group (group of #0) to another group (group of #1). Upon subsequently receiving an IO-based command from the CPU 20, the controller 22 assigns, to each command, Tag # x ("0x0100") and Tag # y ("0x0101") as the tag numbers belonging to the tag pool B (group of #1), and accesses the drives 26 of # C and # D based on the commands to which the respective tag numbers were assigned. Here, even when the controller 22 was accessing the drive 26 of #0 and the drive 26 of # D based on Tag # a ("0x0000") and Tag # b ("0x0001") in substitute for the drive 26 of # A and the drive 26 of # B before the chip reset, a tag overlap will not be reported from the drive 26 of # C and the drive 26 of # D after the chip reset, and the IO processing can thereby be executed in a short time.

Figure 8:
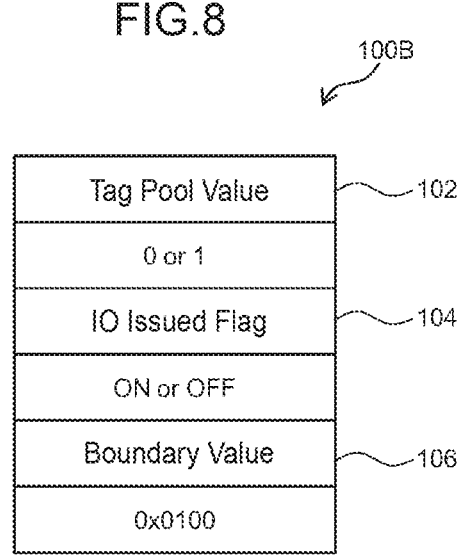
FIG. 8 is a configuration of a micro management table in the second embodiment.

FIG. 8 is a configuration of a micro management table in the second embodiment. In FIG. 8, the micro management table 100B is a table stored in the memory 16, and is configured by comprising a tag pool (Tag Pool) value 102, an IO issued flag 104, and a boundary value 106. The tag pool value 102 and the IO issued flag 104 store the same information as the micro management table 100A. The boundary value 106 stores the information ("0x0100") of the number of tags belonging to one group, and which is also the number of tags indicating the boundary value relative to the other group, when a plurality of tag numbers are separated into two groups.

Figure 9:
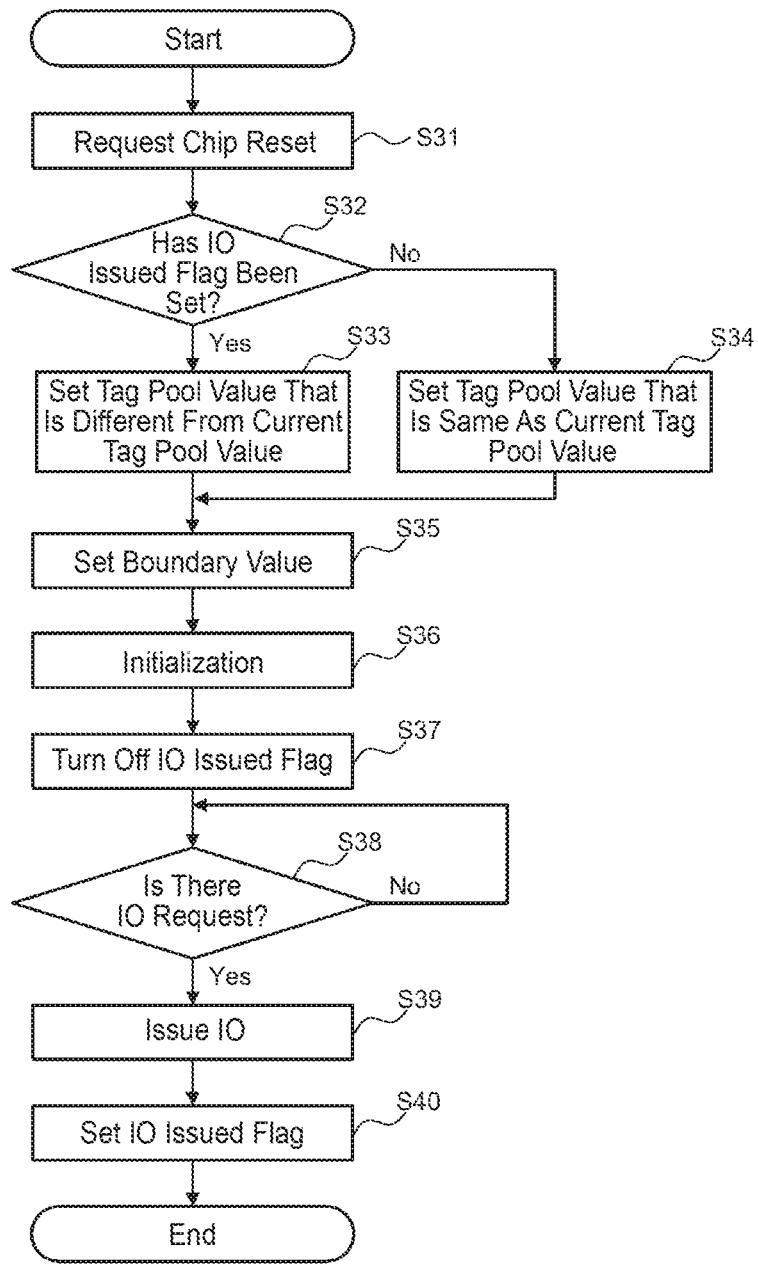
FIG. 9 is a flowchart for explaining the operation of the CPU in the second embodiment.

FIG. 9 is a flowchart for explaining the operation of the CPU in the second embodiment. In FIG. 9, when the CPU 20 receives a chip reset request, for example, as a result of activating a micro program (S31), the CPU 20 refers to the IO issued flag 104 of the micro management table 100B, and evaluates whether or not an IO issued flag has been set (S32).

When a positive determination result is obtained in step S32, the CPU 20 refers to the tag pool value 102 of the micro management table 100B, and sets a tag pool value which is different from the currently set tag pool value (S33). For example, when "0" is currently set as the tag pool value 102, then "1" is set.

Meanwhile, when a negative determination result is obtained in step S32, the CPU 20 refers to the tag pool value 102 of the micro management table 100B, and sets a tag pool value that is the same as the currently set tag pool value 102 (S34).

Subsequently, the CPU 20 refers to the boundary value 106 of the micro management table 100B, and sets the information stored in the boundary value 106 as the boundary value of the number of tags (S35).

Subsequently, the CPU 20 initializes the controller 22 and sets the tag pool value that was set in step S33 or step S34 (S36), as well as causes the controller 22 to execute a chip reset and sets the IO issued flag 104 to "OFF" (S37), and thereafter newly evaluates whether or not an IO request has been issued (S38). The processing of step S38 is continued until a new IO request is issued.

When it is evaluated that an IO request has been issued in step S38, the CPU 20 issues an IO to the controller 22 (S39), sets the IO issued flag to "ON" (S40), and then ends the processing in this routine.

FIG. 10 is a configuration diagram of a controller management table in the second embodiment. In FIG. 10, the controller management table 200D is a table stored in the memory 46 of the controller 22, and is configured by comprising an operation tag pool number (Tag Pool #) 202, a pool number 204, a tag group number 206, and a boundary value 208.

The operation tag pool number (Tag Pool #) 202 and the pool number 204 store the same information as the controller management table 200A, the tag group number 206 stores the same information as the controller management table 200B, and the boundary value 208 stores the information set by the CPU 20, which is also the same information as the micro management table 100B.

Figure 11:
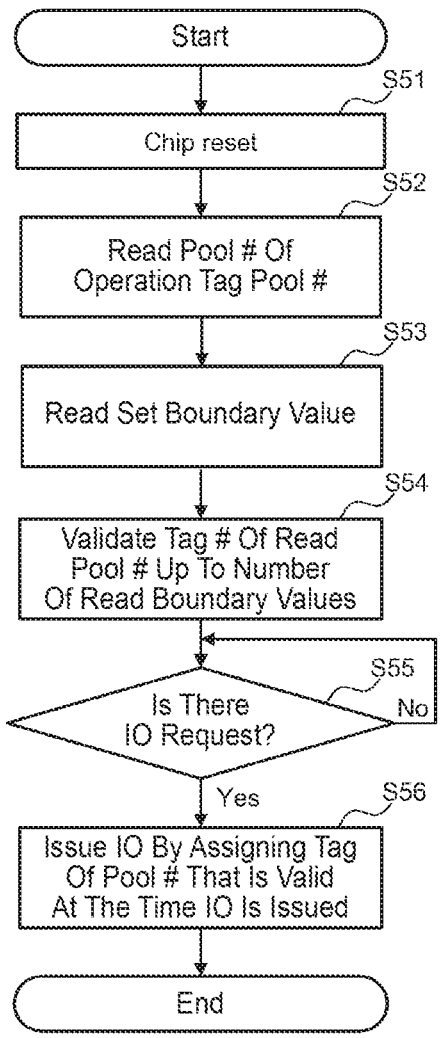
FIG. 11 is a flowchart for explaining the operation of the controller in the second embodiment.

FIG. 11 is a flowchart for explaining the operation of the controller in the second embodiment. In FIG. 11, when the controller 22 receives a chip reset signal as a chip reset instruction from the CPU 20, the controller 22 executes a chip reset (S51), subsequently refers to the operation tag pool number 202 of the controller management table 200D and reads the pool number (Pool #) of the operation tag pool number 202 (S52), refers to the boundary value 208 of the controller management table 200D and reads the set boundary value (S53), and sets, among the tag numbers (Tag #) of the read pool number, the tag numbers (Tag #) up to the quantity of the read boundary value to "Valid" (S54). For example, when the value of the operation tag pool number 202 is "0", the controller 22 stores "Valid" in the pool 0 of the pool number 204, and sets, among the tag numbers belonging to the group of #0 of the tag group number 206, the tag numbers up to the boundary value ("0x0100") to "Valid".

Subsequently, the controller 22 evaluates whether or not an IO request has been issued (S55). When a positive determination result is obtained in step S55; that is, when a new IO request has been received from the CPU 20, the controller 22 refers to the tag group number 206 based on the information of the pool number 204 that is valid upon issuing the IO; for example, issues the IO by assigning to the IO, as a tag, the tag numbers up to the boundary value ("0x0100") among the tag numbers belonging to the group of #0 of the tag group number 206 (S56), accesses the drive 26 based on the IO to which the tag number was assigned, and then ends the processing in this routine.

Figure 12:
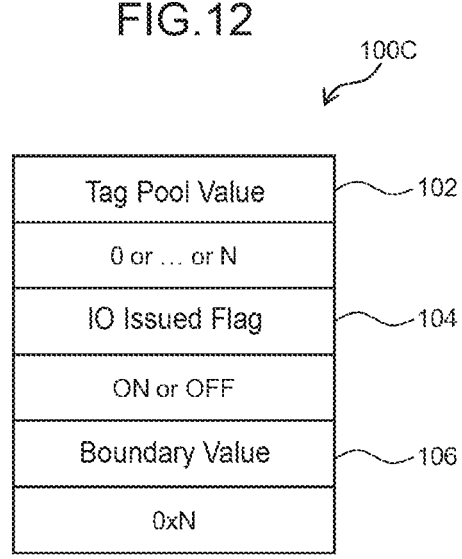
FIG. 12 is a configuration diagram of another micro management table in the second embodiment.

FIG. 12 is a configuration diagram of another micro management table in the second embodiment. In FIG. 12, the micro management table 100C is a table stored in the memory 16, and is configured by comprising a tag pool value 102, an IO issued flag 104, and a boundary value 106. The tag pool value 102 stores information for the CPU 20 to identify the group in cases where a plurality of tag numbers are stored in the memory 46 managed by controller 22 by being separated into groups 0 to N. For example, the information of "0" is stored upon identifying the group of 0, and the information of "N" is stored upon identifying the group of N. The IO issued flag 104 stores the same information as the micro management table 100A. The boundary value 106 stores the information ("0xN") of the number of tags belonging to each group, and which is also the number of tags indicating the boundary value relative to the other groups, when a plurality of tag numbers are separated into groups 0 to N.

Figure 13:
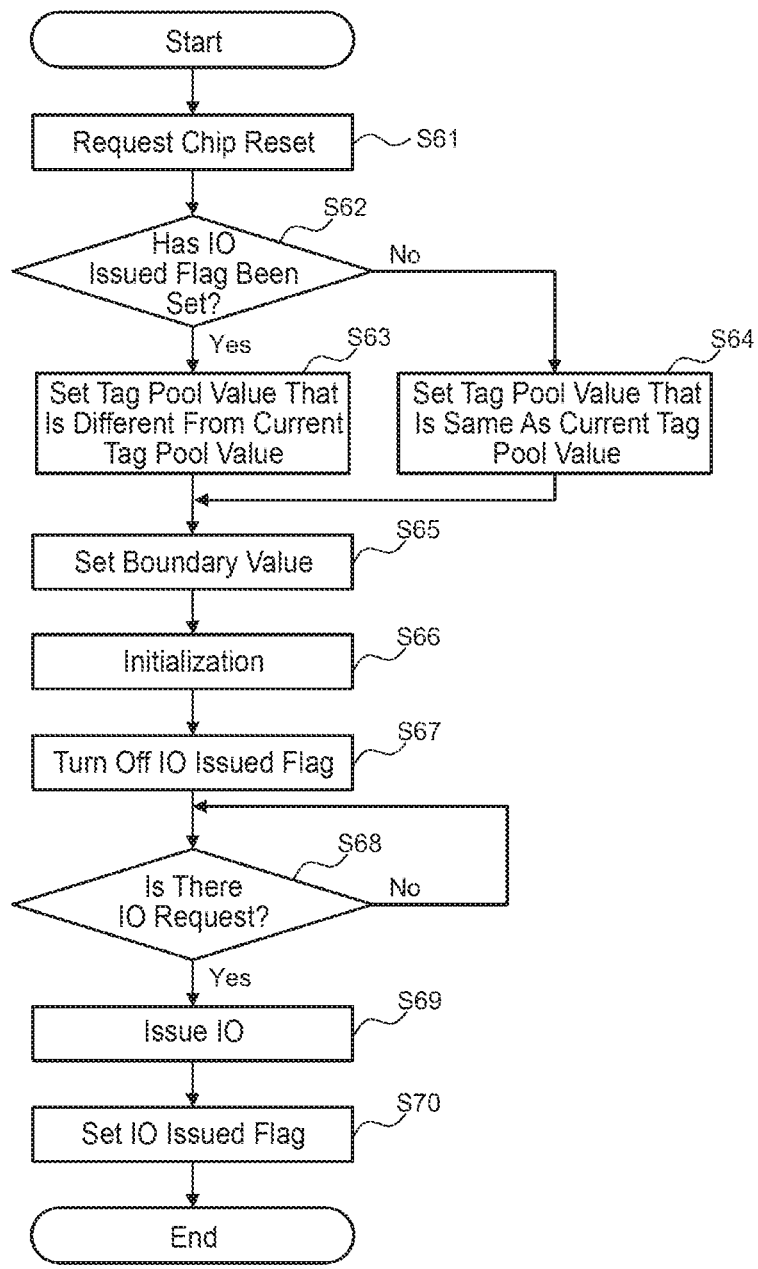
FIG. 13 is a flowchart for explaining other operations of the CPU in the second embodiment.

FIG. 13 is a flowchart for explaining other operations of the CPU in the second embodiment. In FIG. 13, when the CPU 20 receives a chip reset request, for example, as a result of activating a micro program (S61), the CPU 20 refers to the IO issued flag 104 of the micro management table 100C, and evaluates whether or not an IO issued flag has been set (S62).

When a positive determination result is obtained in step S62, the CPU 20 refers to the tag pool value 102 of the micro management table 100C, and sets a tag pool value which is different from the currently set tag pool value (S63). For example, when "0" is currently set as the tag pool value 102, then one among "1" to "N" is set.

Meanwhile, when a negative determination result is obtained in step S62, the CPU 20 refers to the tag pool value 102 of the micro management table 100C, and sets a tag pool value that is the same as the currently set tag pool value 102 (S64).

Subsequently, the CPU 20 refers to the boundary value 106 of the micro management table 100C, and sets the information stored in the boundary value 106 as the boundary value of the number of tags (S65).

Subsequently, the CPU 20 initializes the controller 22 and sets the tag pool value that was set in step S63 or step S64 (S66), as well as causes the controller 22 to execute a chip reset and sets the IO issued flag 104 to "OFF" (S67), and thereafter newly evaluates whether or not an IO request has been issued (S68). The processing of step S68 is continued until a new IO request is issued.

When it is evaluated that an IO request has been issued in step S68, the CPU 20 issues an IO to the controller 22 (S69), sets the IO issued flag to "ON" (S70), and then ends the processing in this routine.

FIG. 14 is a configuration diagram of another controller management table in the second embodiment. In FIG. 14, the controller management table 200E is a table stored in the memory 46 of the controller 22, and is configured by comprising an operation tag pool number (Tag Pool #) 202, a pool number 204, a tag group number 206, and a boundary value 208.

The operation tag pool number (Tag Pool #) 202 stores the information of one among "0" to "N" as the information corresponding to the tag pool value set by the CPU 20. The pool number 204 is configured from a pool 0 to a pool N, and stores the information of "Valid" as being valid in a pool number (one pool number) corresponding to the pool number set in the operation tag pool number 202. For example, when "0" is set in the operation tag pool number (Tag Pool #) 202, the information of "Valid" as being valid is stored in the pool 0 of the pool number 204. The tag group number 206 stores the same information as the controller management table 200C, and the boundary value 208 stores the information set by the CPU 20, and which is also the same information as the micro management table 100C.

Figure 15:
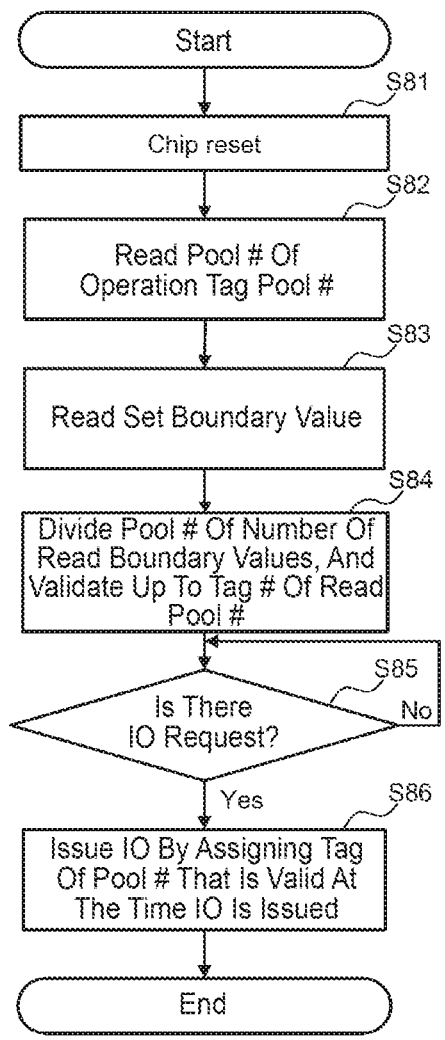
FIG. 15 is a flowchart for explaining other operations of the controller in the second embodiment.

FIG. 15 is a flowchart for explaining other operations of the controller in the second embodiment. In FIG. 15, when the controller 22 receives a chip reset signal as a chip reset instruction from the CPU 20, the controller 22 executes a chip reset (S81), subsequently refers to the operation tag pool number 202 of the controller management table 200E and reads the pool number (Pool #) of the operation tag pool number 202 (S82), refers to the boundary value 208 of the controller management table 200E and reads the set boundary value (S83), divides the pool numbers into the quantity of the read boundary value and sets, among the tag numbers (Tag #) of the read pool number, the tag numbers (Tag #) up to the quantity of the read boundary value to "Valid" (S84). For example, when the value of the operation tag pool number 202 is "0", the controller 22 stores "Valid" in the pool 0 of the pool number 204, and sets, among the tag numbers belonging to the group of #0 of the tag group number 206, the tag numbers up to the boundary value ("0xN") to "Valid".

Subsequently, the controller 22 evaluates whether or not an IO request has been issued (S85). When a positive determination result is obtained in step S85; that is, when a new IO request has been received from the CPU 20, the controller 22 refers to the tag group number 206 based on the information of the pool number 204 that is valid upon issuing the IO; for example, issues the IO by assigning to the IO, as a tag, the tag numbers up to the boundary value ("0xN") among the tag numbers belonging to the group of #0 of the tag group number 206 (S86), accesses the drive 26 based on the IO to which the tag number was assigned, and then ends the processing in this routine.

According to this embodiment, because a plurality of different tag numbers are managed by being separated into two or more groups and the tag numbers belonging to each group are set to be variable, even when the failure processing recovery time is shortened after the chip reset during a failure in which a chip reset is frequently required, it is possible to prevent the overlap of tag numbers assigned to each command.

Third Embodiment

In this embodiment, the plurality of different tag numbers are managed by being separated into a plurality of IO groups and a plurality of task groups, and the remaining configuration is the same as the first embodiment. FIG. 16 is a diagram for explaining the concept of the third embodiment, wherein FIG. 16(A) is a configuration diagram of a micro management table, and FIG. 16(B) is a configuration diagram of a controller management table. In FIG. 16(A), the micro management table 100D is configured from a tag pool value 102, an IO issued flag 104, an all device reset request flag 110, and a command identification flag 112.

The tag pool value 102 and the IO issued flag 104 store the same information as the micro management table 100A. The all device reset request flag 110 stores the information of "ON" when the CPU 20 sets a flag for requesting a reset to all drives 26, and stores the information of "OFF" when the CPU 20 has not set a flag for requesting a reset to all drives 26. The command identification flag 112 is a flag for identifying the command issued by the CPU 20, and, when the CPU 20 issues a task as the command, the information of "1" is stored in the Task of the command identification flag 112 and the information of "0" is stored in the IO of the command identification flag 112. Meanwhile, when the CPU 20 issues an IO as the command, the information of "1" is stored in the IO of the command identification flag 112, and the information of "0" is stored in the Task.

In FIG. 16(B), the controller management table 200F is configured from a task tag pool 210, and an IO tag pool 212. The task tag pool 210 is divided into a group of 0 (group of #0) and a group of 1 (group of #1), and the information of "0x0000" to "0x00FF" is stored as the tag numbers in the group of #0, and the information of "0x8000" to "0x80FF" is stored as the tag numbers in the group of #1 of the task tag pool 210. The IO tag pool 212 is divided into a group of 0 (group of #0) and a group of 1 (group of #1), and the information of "0x0100" to "0x7FFF" is stored as the tag numbers in the group of #0 and the information of "0x8100" to "0xFFFF" is stored as the tag numbers in the group of #1 of the IO tag pool 212. In the foregoing case, tag numbers in a quantity that is greater than the number of tag numbers belonging to each group of the task tag pool 210 are stored in each group of the IO tag pool 212.

Figure 17:
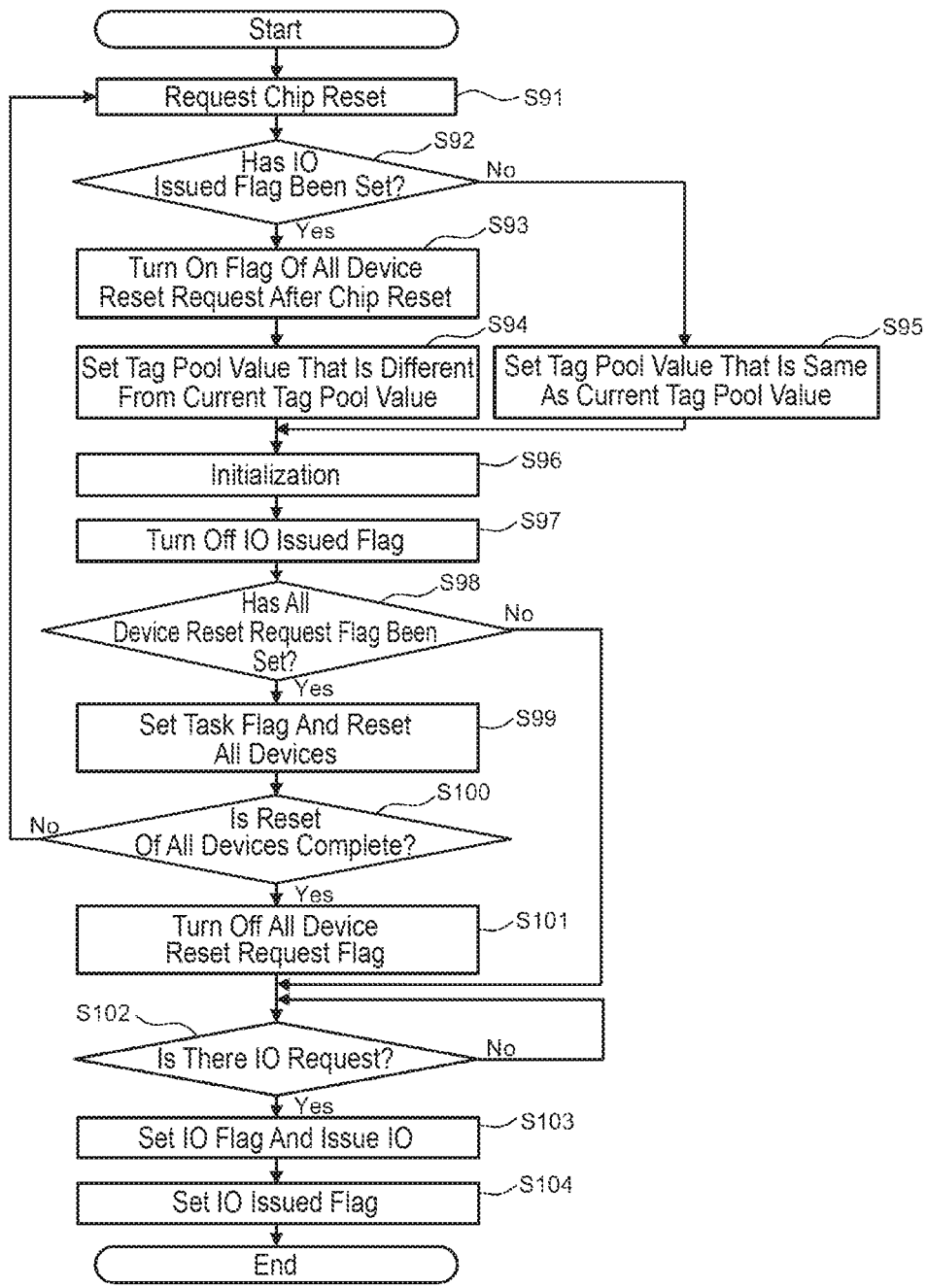
FIG. 17 is a flowchart for explaining the operation of the controller in the third embodiment.

FIG. 17 is a flowchart for explaining the operation of the controller in the third embodiment. In FIG. 17, when the controller 22 receives a chip reset request, for example, as a result of activating a micro program (S91), the controller 22 refers to the IO issued flag 104 of the micro management table 100D, and evaluates whether or not an IO issued flag has been set (S92).

When a positive determination result is obtained in step S92, the CPU 20 turns the flag of the all device reset request (all device reset request flag 110) after the chip reset to "ON" (S93), refers to the tag pool value 102 of the micro management table 100D, and sets a tag pool value which is different from the currently set tag pool value (S94). For example, when "0" is currently set as the tag pool value 102, then "1" is set.

Meanwhile, when a negative determination result is obtained in step S92, the CPU 20 refers to the tag pool value 102 of the micro management table 100D, and sets a tag pool value that is the same as the currently set tag pool value 102 (S95).

Subsequently, the CPU 20 initializes the controller 22 and sets the tag pool value that was set in step S94 or step S95 (S96), as well as causes the controller 22 to execute a chip reset and sets the IO issued flag 104 to "OFF" (S97), and thereafter refers to the all device reset request flag 110 of the micro management table 100D and evaluates whether or not an all device reset request flag set has been set (S98).

When a negative determination result is obtained in step S98, the CPU 20 proceeds to the processing of step S102, and, when a positive determination result is obtained in step S98, the CPU 20 sets a task flag and issues a task for resetting all devices (all drives) (S99), and evaluates whether or not the all device reset is complete (S100).

When a negative determination result is obtained in step S100, the controller 22 returns to the processing of step S91 and repeats the processing of step S91 to step S100, and, when a positive determination result is obtained in step S100, the controller 22 sets the all device reset request flag 110 from "ON" to "OFF" (S101), and evaluates whether or not an IO request has been issued (S102). The processing of step S102 is continued until a new IO request is issued.

When a positive determination result is obtained in step S102, the CPU 20 sets an IO flag and sets the IO issued flag 104 to "ON", issues an IO for setting the group of #0 as the IO tag pool 212 to the controller 22 (S103), thereafter sets the IO issued flag 104 to "ON" (S104), and then ends the processing in this routine.

FIG. 18 is a configuration diagram of a controller management table in the third embodiment. In FIG. 18, the controller management table 200G is configured from an operation tag pool value 202, a pool number 204, a task tag pool 210, an IO tag pool 212, and a command identification flag 214.

The operation tag pool value 202 and the pool number 204 store the same information as the controller management table 200A, the task tag pool 210 and the IO tag pool 212 store the same information as the controller management table 200F, and the command identification flag 214 stores the same information as the micro management table 100D.

Figure 19:
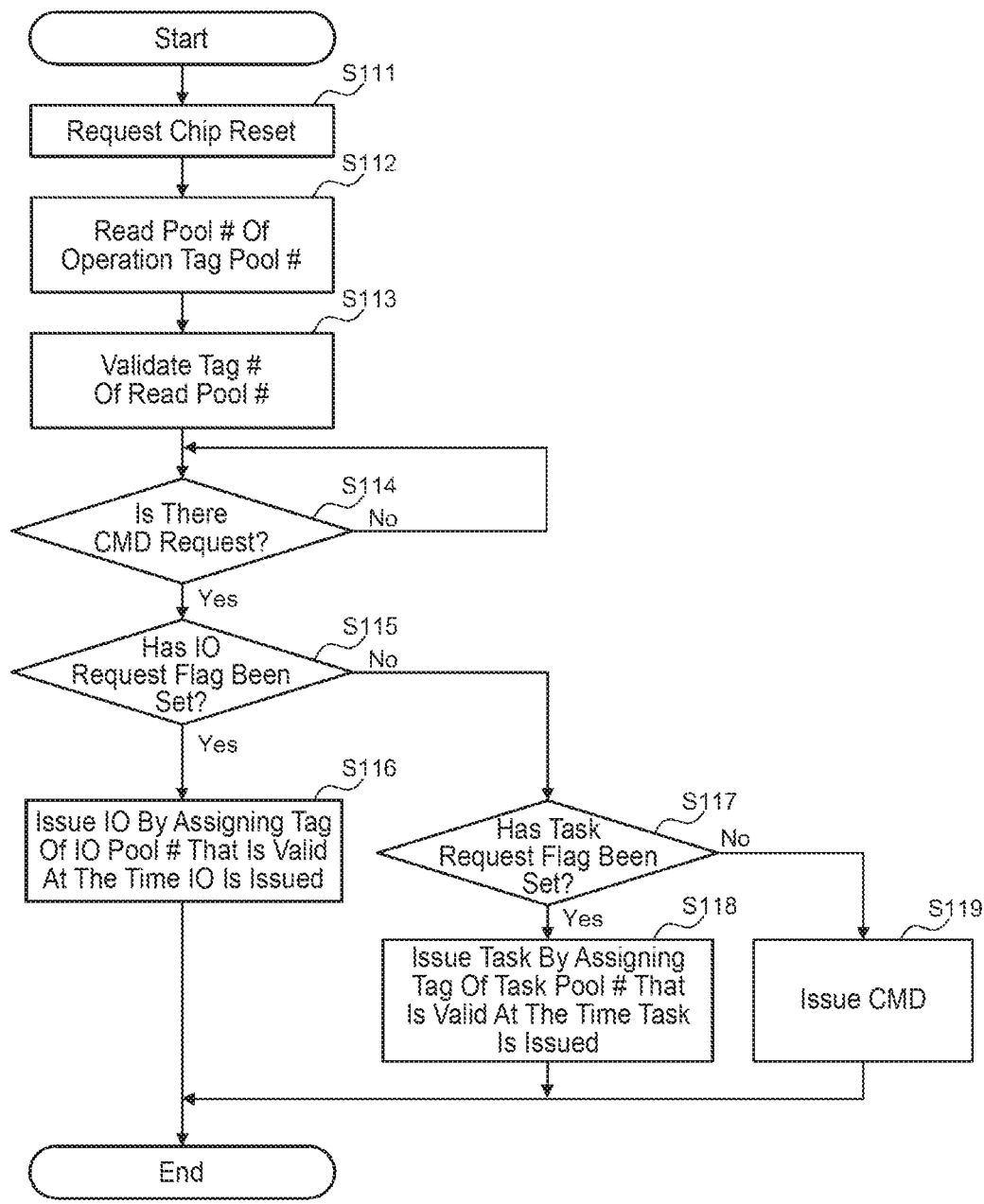
FIG. 19 is a flowchart for explaining the operation of the controller in the third embodiment.

FIG. 19 is a flowchart for explaining the operation of the controller in the third embodiment. In FIG. 19, when the controller 22 receives a chip reset signal as a chip reset instruction from the CPU 20, the controller 22 executes a chip reset (S111), subsequently refers to the operation tag pool number 202 of the controller management table 200G and reads the pool number (Pool #) of the operation tag pool number 202 (S112), and sets the tag number (Tag #) of the read pool number to "Valid" (S113). For example, when the value of the operation tag pool number 202 is "0", the controller 22 stores the information of "Valid" in the pool 0 of the pool number 204.

Subsequently, the controller 22 evaluates whether or not a command (CMD) request has been issued (S114), and, when a positive determination result is obtained in step S114, the controller 22 refers to the command identification flag 214 and evaluates whether or not an IO request flag has been set (S115). The processing of step S114 is continued until the controller 22 receives a command request.

When a positive determination result is obtained in step S115, the controller 22 issues an IO by assigning a tag of an IO pool number (Pool #) that is valid upon issuing the IO, executes the input/output processing to the drive 26 (S116), and then ends the processing in this routine.

Meanwhile, when a negative determination result is obtained in step S115, the controller 22 refers to the command identification flag 214 and evaluates whether or not a task request flag has been set (S117), and, when a positive determination result is obtained in step S117, the controller issues a task by assigning a tag of the task pool number (Pool #) that is valid upon issuing the task, executes the task processing to the drive 26 (S118), and then ends the processing in this routine.

Meanwhile, when a negative determination result is obtained in step S117, the controller 22 determines that it is not necessary to assign a "tag number" to the command, issues a command (CMD) to which a tag number has not been assigned (S119), and then ends the processing in this routine.

In the third embodiment, the controller 22 manages a plurality of different tag numbers by separating the plurality of different tag numbers into a plurality of IO groups and a plurality of task groups, and, upon receiving an IO request as the first command from the CPU 20, assigns a tag number belonging to one group among the plurality of IO groups to the IO request, and transfers the IO request to which the tag number was assigned to a designated drive 26, and, upon receiving a task request as the first command from the CPU 20, assigns a tag number belonging to one task group among the plurality of task groups to the task request, and transfers the task request to which the tag number was assigned to a designated drive 26, and, upon receiving an IO request as the second command from the CPU 20 after the chip reset, assigns a tag number belonging to an IO group which is different from the IO group used before the chip reset to the IO request, and transfers the IO request to which the tag number was assigned to a designated drive 26, and, upon receiving a task request as the second command from the CPU 20 after the chip reset, assigns a tag number belonging to a task group which is different from the task group used before the chip reset to the task request, and transfers the task request to which the tag number was assigned to a designated drive 26.

Here, the CPU 20 adds IO group information (IO tag pool 212) for identifying one group among the plurality of IO groups to an IO request before issuing the instruction of the chip reset, and adds, to an IO request after issuing the instruction of the chip reset, IO group information for identifying another group which is different from the group belonging to the IO group information added to the IO request before issuing the instruction of the chip reset among the plurality of IO groups, and adds task group information (task tag pool 210) for identifying one group among the plurality of task groups to a task request before issuing the instruction of the chip reset, and adds, to a task request after issuing the instruction of the chip reset, task group information for identifying another group which is different from the group belonging to the task group information added to the task request before issuing the instruction of the chip reset the plurality of task groups. When the controller 22 receives an IO request or a task request from the CPU 20 before or after the chip reset, the controller 22 can identify the group according to the IO group information added to the received IO request or the task group information added to the received task request. In other words, as a result of the controller 22 identifying the group according to the IO group information added to the IO request or the task group information added to the task request, it is possible to prevent the overlapping of tag numbers to be assigned to the IO request or the task request after the chip reset.

According to the third embodiment, because a plurality of different tag numbers are managed by being separated into a plurality of groups according to the content of the command, and because the tag numbers belonging to each group are set to be variable, even when the failure processing recovery time is shortened after the chip reset, it is possible to prevent the overlapping of tag numbers to be assigned to each command. Thus, each drive 26 is able to execute IO processing or task processing after the chip reset within a set time.

Note that the present invention is not limited to the foregoing first embodiment to third embodiment, and also covers various modified examples. For example, when the controller 22 manages a plurality of different tag numbers by separating the plurality of different tag numbers into a plurality of groups, the plurality of different tag numbers can be managed only by the controller 22 without depending on the setting of the CPU 20. In the foregoing case, the controller 22 will arbitrarily select different groups before and after the chip reset, and assign, in sequence, the tag numbers belonging to the selected group to the command. Moreover, an information processing program to be executed by a computer including the CPU 20, the controller 22 and a plurality of drives 26 may be stored in the memory 16 as a storage medium. The foregoing embodiments were explained in detail for facilitating the understanding of the present invention, and the present invention is not limited to a configuration comprising all of the components explained above. Moreover, a part of the configuration of a certain embodiment may also be replaced with the configuration of another embodiment. Moreover, the configuration of a certain embodiment may also be added to the configuration of another embodiment. Moreover, a part of the configuration of each embodiment may be added with, deleted from, or replaced by another configuration.

A part or all of each of the foregoing configurations, functions, processing units, and processing means may also be realized with hardware, for instance, by designing an integrated circuit. Moreover, each of the foregoing configurations, functions and the like may also be realized with software by a processor interpreting and executing programs which realize the respective functions. Programs, tables, files and other information for realizing the respective functions may be stored in a recording device such as a memory, a hard disk drive, or an SSD (Solid State Drive), or in a recording medium such as an IC card, an SD card, or a DVD.

REFERENCE SIGNS LIST 10 host, 12 network, 14 storage apparatus, 16 memory, 18 host interface, 20 CPU, 22 controller, 24 expander, 26 drive, 42 CPU, 100 micro management table, 200 controller management table

The invention claimed is:

1. A storage apparatus comprising:
   a plurality of storage devices that store data;
   a controller that executes data input/output (IO) processing to the storage devices, and
   a processor that transmits and receives information to and from the controller,
   wherein the controller:
   manages a plurality of tag numbers by separating the plurality of tag numbers into a plurality of IO groups and a plurality of task groups;
   upon receiving a first IO request from the processor, assigns a first IO tag number belonging to a first IO group among the plurality of groups to the first IO request, and transfers the first IO request to a first designated storage device from among the plurality of storage devices,
   upon receiving a first task request from the processor, assigns a first task tag number belonging to a first task group among the plurality of task groups to the first task request, and transfers the first task request to a second designated storage device from among the plurality of storage devices,
   upon subsequently receiving an instruction for a chip reset from the processor, executes the chip reset, upon receiving a second IO request d from the processor after the chip reset, assigns a second IO tag number belonging to a second IO group among the plurality of IO groups to the second IO request, and transfers the second IO request to a third designated storage device from among the plurality of storage devices, wherein the first IO group is different from the second TO group, and upon receiving a second task request from the processor after the chip reset, assigns a second task tag number belonging to a second task group from among the plurality of task groups to the second task request, and transfers the second task request to a fourth designated storage device from among the plurality of storage devices, wherein the first task group is different from the second task group.

2. The storage apparatus according to claim 1, wherein, upon receiving a plurality of the second IO requests from the processor after the chip reset, the controller assigns, in sequence, respective IO tag number belonging to the second IO group to each of the plurality of the second IO requests.

3. The storage apparatus according to claim 1, wherein the controller includes, as a table to be used as a reference upon receiving the first IO request or the second IO request from the processor, a controller management table in which the plurality of tag numbers are stored by being separated into the plurality of IO groups.

4. The storage apparatus according to claim 1, wherein the controller includes, as a table to be used as a reference upon receiving the first task request or the second task request from the processor, a controller management table in which the plurality of tag numbers are stored by being separated into the plurality of task groups.

5. The storage apparatus according to claim 1, wherein the controller includes, as a table to be used as a reference upon receiving the first IO request, the first task request, the second IO request or the second IO request from the processor, a controller management table in which the plurality of tag numbers are stored by being separated into the plurality of IO groups and the plurality of task groups.

6. The storage apparatus according to claim 5, wherein each IO group of the controller management table stores more tag numbers than the number of tag numbers belonging to each of the task groups.

7. The storage apparatus according to claim 1, wherein the processor further:
adds IO group information for identifying the first IO group to the first IO request before issuing the instruction of the chip reset, and adds, to the second IO request after issuing the instruction of the chip reset, IO group information for identifying second IO group another group which is different from the group belonging to the IO group; and
adds task group information for the first task group to the first task request before issuing the instruction of the chip reset, and adds, to the second task request after issuing the instruction of the chip reset, task group information for identifying the second task group,
wherein, upon receiving the second IO request the processor before or after the chip reset, the controller identifies a particular TO group according to the IO group information added to the second IO request received, and wherein upon receiving the second the processor before or after the chip reset, the controller identifies a particular task group according to the task group information added to the second task request received.

8. A storage apparatus comprising:
a plurality of storage devices that stores data;
a controller that executes data input/output (IO) processing to the storage devices, and
a processor that transmits and receives information to and from the controller,
wherein the controller is configured to:
manage a plurality of tag numbers by separating the plurality of tag numbers into a plurality of groups; and
upon receiving a first command from the processor, assign a first tag number belonging to a first group among the plurality of groups to the first command, and transfer the first command to a first designated storage device from among the plurality of storage devices,
upon subsequently receiving an instruction for a chip reset from the processor, execute the chip reset,
upon receiving a second command from the processor after the chip reset, assign a second tag number belonging to a second group among the plurality of groups to the second command and transfer the second command to a second designated storage device from among the plurality of storage devices, wherein the first group is different from the second group;
wherein the processor is configured to:
add group information for identifying the first group to the command before issuing the instruction of the chip reset, and
add to the command after issuing the instruction of the chip reset, group information for identifying the second group; and
wherein, upon receiving the command from the processor before or after the chip reset, the controller is further configured to:
identify a particular group according to the group information added to the command received.

9. A method for managing a data storage network, the method comprising:
managing, by a controller, a plurality of tag numbers by separating the of tag numbers into a plurality of input/output (IO) groups and a plurality of task groups;
upon receiving, by the controller, a first IO request from a processor, assigning, by the processor, a first IO tag number belonging to a first IO group among the plurality of IO groups to the first IO request, and transferring the first IO request to a first designated storage device from among a plurality of storage devices that communicatively coupled to the controller;
upon receiving, by the controller, a first task request from the processor, assigning, by the controller, a first task tag number belonging to a first task group among the plurality of task groups to the first task request, and transferring, by the processor, the first task request to a second designated storage device from among the plurality of storage devices;
upon subsequently receiving, by the controller, an instruction for a chip reset, executing, by the controller, the chip reset; upon receiving, by the controller, a second IO request from the processor after the chip reset, assigning, by the controller, a second IO tag number belonging to a second IO group among the plurality of IO groups to the second IO request, and transferring, by the controller, the second IO request to a third designated storage device from among the plurality of storage devices, wherein the first IO group is different from the second IO group; and upon receiving, by the controller, a second task request from the processor after the chip reset, assigning, by the processor, a second task tag number belonging to a second task group from among the plurality of task groups to the second task request, and transferring, by the processor, the second task request to a fourth designated storage device from among the plurality of storage devices, wherein the first task group is different from the second task group.

10. The method according to claim 9, wherein, upon receiving a plurality of the second IO requests from the processor, the controller assigns, in sequence, a respective IO tag number belonging to the second group to each of the second IO requests.

11. The method according to claim 9, wherein the controller includes, as a table to be used as a reference upon receiving the first IO request or the second IO request from the processor, a controller management table in which the plurality of tag numbers are stored by being separated into the plurality of IO groups.

12. The method according to claim 9, wherein the controller includes, as a table to be used as a reference upon receiving the first task request or the second task request from the processor, a controller management table in which the plurality of tag numbers are stored by being separated into the plurality of task groups.

13. The method according to claim 9, wherein the controller includes, as a table to be used as a reference upon receiving the first IO request, the first task request, the second IO request or the second IO request from the processor, a controller management table in which the plurality of tag numbers are stored by being separated into the plurality of IO groups and the plurality of task groups.

* * * * *